United States Patent [19]

Matthews et al.

[11] 4,407,830
[45] Oct. 4, 1983

[54] METHOD OF MAKING A FAT COATED MEAT PRODUCT

[75] Inventors: Bernard T. Matthews, Norwich; Alan J. Benstead, Aylesham; David J. Joll, Reepham; Sidney Thorp, Swanton Morley; David N. Wilson, Hellesdon, all of England

[73] Assignee: Bernard Matthews Limited, Norfolk, England

[21] Appl. No.: 162,241

[22] Filed: Jun. 23, 1980

[30] Foreign Application Priority Data

Jun. 28, 1979 [GB] United Kingdom ............... 7922452

[51] Int. Cl.³ ............................................. A22C 11/00
[52] U.S. Cl. ................................... 426/272; 426/302; 426/413; 426/513
[58] Field of Search ............... 426/90, 92, 100, 105, 426/129, 135, 138, 284, 302, 641, 646, 652, 414, 415, 420, 513, 516, 518, 524, 644, 104, 272, 413; 425/131.1, 133.1; 17/35, 41; 138/118.1

[56] References Cited

U.S. PATENT DOCUMENTS

| | | | |
|---|---|---|---|
| 3,399,423 | 9/1968 | Kielsmeier et al. | 17/35 |
| 3,563,764 | 2/1971 | Posegate | 426/92 |
| 3,752,618 | 8/1973 | Moreland | 425/133.1 |
| 3,778,209 | 12/1973 | Wallace et al. | 425/133.1 |
| 3,892,009 | 7/1975 | Townsend | 17/35 |
| 3,911,154 | 10/1975 | Weatherspoon | 426/92 X |
| 4,207,046 | 6/1980 | Ayala et al. | 425/133.1 |

FOREIGN PATENT DOCUMENTS

| | | | |
|---|---|---|---|
| 162649 | 6/1955 | Australia | 426/513 |
| 4502 | 10/1979 | European Pat. Off. | |

Primary Examiner—Arthur L. Corbin
Attorney, Agent, or Firm—Parkhurst & Oliff

[57] ABSTRACT

A meat based product is extruded as an elongate billet 14 from the head 10 of a mandrel 1. The mandrel 1 has inner and outer passages to coextrude a meat core and a fat annular coating from the head into an outer casing 13.

3 Claims, 12 Drawing Figures

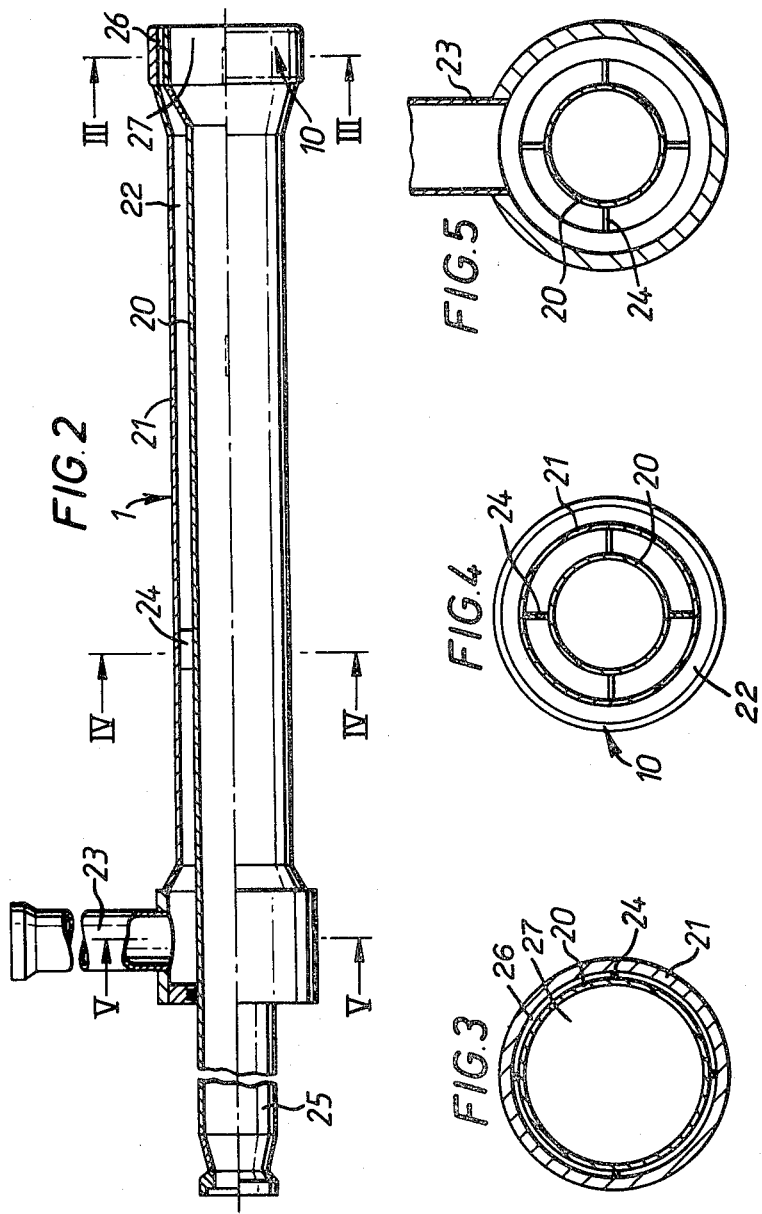

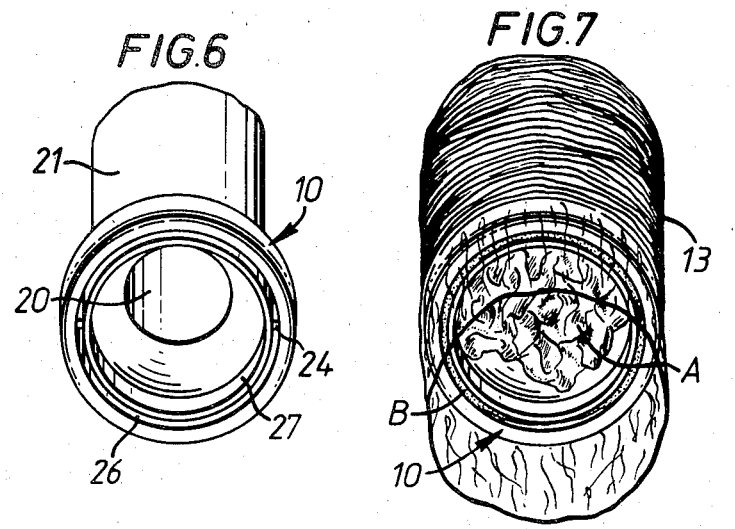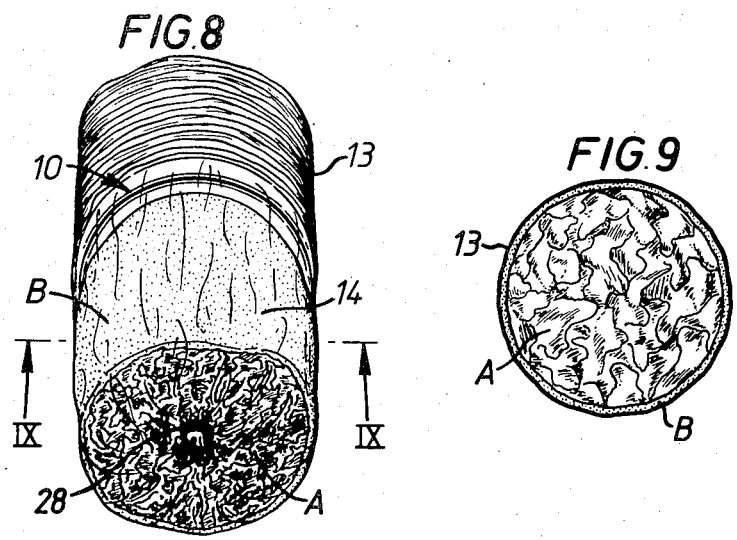

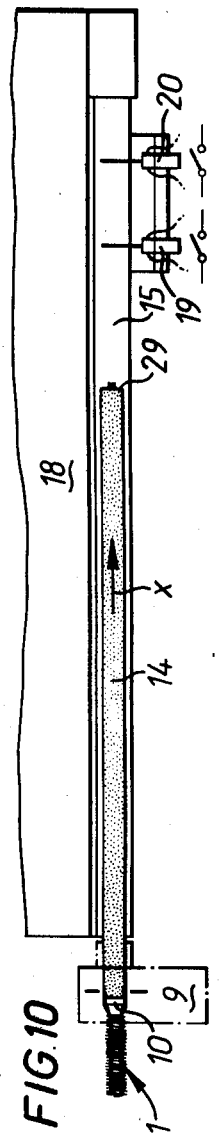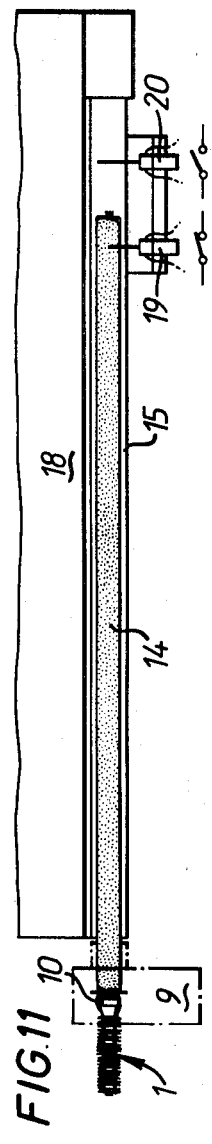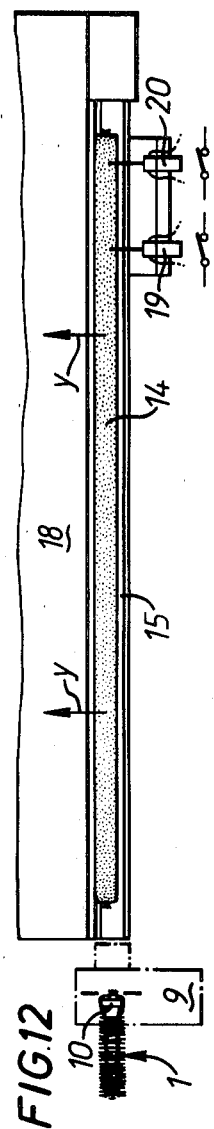

METHOD OF MAKING A FAT COATED MEAT PRODUCT

This invention relates to the manufacture of a food product of constant cross section with a relatively solid main body or core and a thinner outer layer of less solid, relatively mobile material. One exemplary product with which the invention is specially concerned comprises a core of turkey or other meat and a relatively thin uniform outer layer of fat within which the meat is cooked.

The mass-production of a food product of the kind set forth above presents a problem owing to the physical dissimilarity between the core and outer layer. The technique of rendering the core and outer layer physically homogeneous by, for example heating is not appropriate to the food industry.

According to the present invention a method of manufacturing a food product with a relatively solid core and a more mobile outer layer comprises coextruding the core and outer layer into a casing dispensed from the extrusion head. The casing has a closed end immediately in front of the head before extrusion commences and as the extruded food product advances from the head the casing is carried with it. The casing is a sufficiently close fit on the outer layer to preserve the coherent and even extruded form to provide a product such as would be obtained by the concentric co-extrusion of two physically similar extrudable substances.

When the desired length of product has been extruded the product is cut and the casing closed around the rear end; the means effecting the closure preferably also closes the front end of the casing of the product behind at a position immediately in front of the extrusion head.

Thus the essence of the invention is the dispensing of the casing from the extrusion head to contain the mobile outer layer and this can conveniently be contrived by extruding from an elongate mandrel with the casing stock stored around the outer periphery of the mandrel.

The invention will now be described by way of example and with reference to the accompanying drawings wherein:

FIG. 2 is a side view partly in section of the extrusion mandrel of the apparatus of FIG. 1;

FIGS. 3, 4 and 5 are sections on the lines III—III, IV—IV and V—V of FIG. 2;

FIG. 6 is an elevation of the extrusion head of the mandrel;

FIG. 7 is view of the extrusion head with a casing prior to closure and emerging extruded food product;

FIG. 8 is a view similar to FIG. 7 showing the meat product having advanced a short distance with the casing closed;

FIG. 9 is a section of the food product on the line IX—IX of FIG. 8; and

FIGS. 10, 11 and 12 are schematic plan views illustrating how a food product in the form of an elongate billet leaves the mandrel and is discharged into a freezing tank.

Figure 1:
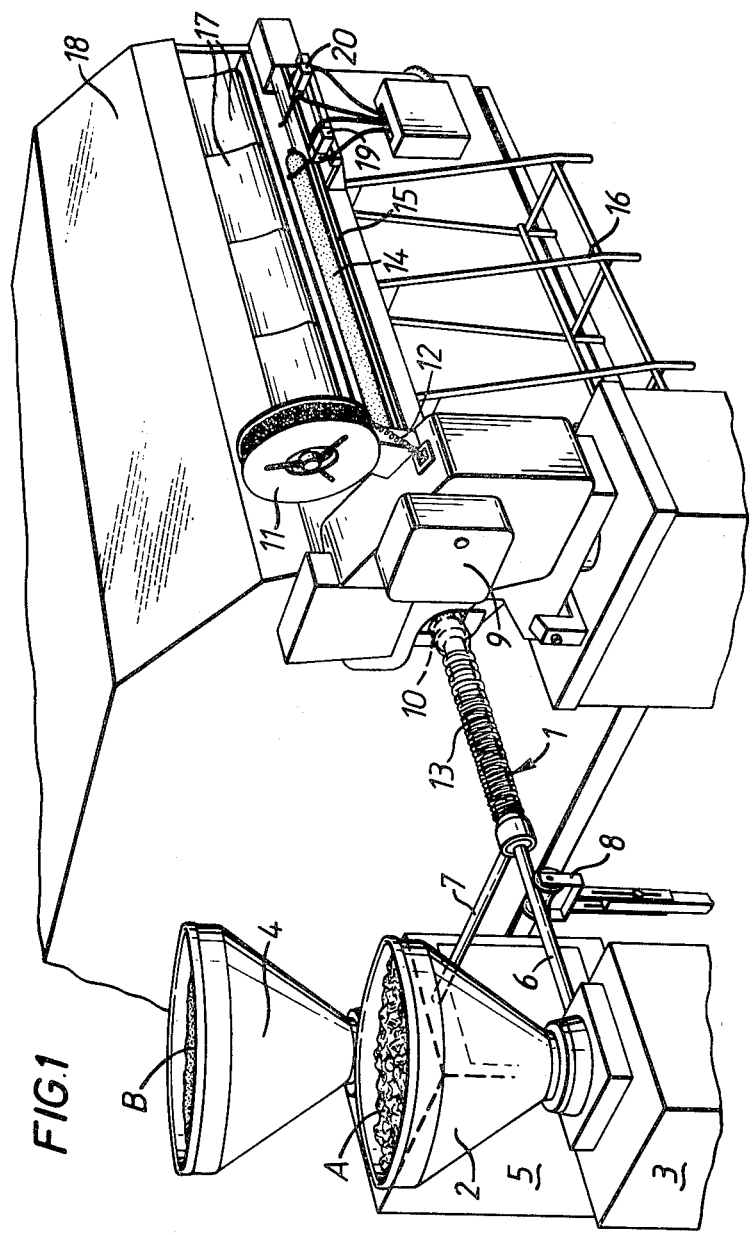
FIG. 1 is a partially schematic elevation view of an apparatus for putting the present invention into effect.

Referring initially to FIG. 1 of the drawings the apparatus illustrated comprises an extrusion mandrel 1 fed with large intact natural pieces of turkey or other meat A from a first hopper 2 by a vane pump in housing 3 and with liquified fat material B from a second hopper 4 by a vane pump in housing 5. The meat is raw and deboned and preferably mechanically massaged with salt to produce salt-soluble proteins which enhance the bonding properties of the meat. Pipes 6 and 7 extend from the hoppers 2 and 3 respectively to central passage and the surrounding annulus of mandrel 1 as will be described with reference to FIGS. 2 to 5. Pipe 6 is supported by stand 8. A cutting, closing and clipping apparatus 9 is positioned over the extrusion head 10 of mandrel 1 and has a reel 11 dispensing clipping stock 12. Thin, approximately 20 microns, tubular casing stock 13 of non-toxic transparent plastics is threaded onto the mandrel 1.

A tiltable track 15 supported on legs 16 receives the elongate cased billet 14 extruded from mandrel 1. When finally discharged, billet 14 is tipped sideways through flaps 17 into a freezing tank 18. This tipping and the necessary starting and stopping of the extrusion process, as will be described subsequently with reference to FIGS. 10 to 12, is effected by microswitches 19 and 20.

The detailed construction of the extrusion mandrel 1 will now be described with reference to FIGS. 2 to 5 of the drawings.

The elongate extrusion mandrel 1 has inner and outer concentric sections 20 and 21 of circular cross section. The inner section 20 provides the totally unobstructed passage necessary for the passage of turkey meat A which is solid in consistency often comprising large intact natural pieces. An axial inlet 25 at the rear end of the inner section 2 allows the entry of this meat from pipe 6 (see FIG. 1). The mandrel outer section or casing 21 defines with the inner section 20 a separate annular space 22 through which the mobile fluid fat B forming the outer layer of the food product flows. A radially extending pipe 23 at the rear end of the mandrel 1 provides an inlet for the fat from pipe 7 (see FIG. 1). As can well be seen from the sectional views, vanes 24 connect the inner and outer sections 20 and 21.

The extrusion head 10 is formed by the laterally (i.e., cross-sectionally) enlarged front end part of the mandrel and is seen in section in FIG. 2. The space 22 is constricted here to define an annular frontwardly facing extrusion orifice 26 which reduces the thickness of the extruded fatty layer. The main length of the space 22 through which the fat flows is relatively wide to allow free flow of the fat which, though fluid, may be quite viscous especially in the cool ambient conditions usual in the food industry. The frontwardly facing extrusion orifice 27 of passage 20 will, by virtue of increased of cross-sectional area, allow the meat some degree of physical relaxation before it enters its casing.

The operation of the apparatus will now be described with reference to FIGS. 6 to 12 of the drawings.

The extrusion head 10 of the mandrel 1 is shown empty in FIG. 6. On activation of the extrusion pumps the extrusion product comprising the core of meat A and annular outer layer of fat B advances to the outlet end of the mandrel 1 into the extrusion head 10. This can be seen in FIG. 7. The tubular casing 13 is pulled forward a short distance by hand from the outlet end of the mandrel, and the apparatus 9 is operated to draw the casing 13 around the front of the emerging billet 14 and to secure the casing with a front clip 28. The core and annulus of fatty material first contact each other as they are coextruded from the mandrel into the casing. This position is illustrated in FIG. 8 and it will be noted that with the advance under extrusion pressure of the meat and fat the billet end part 29 becomes rounded. It should be noted that the dimensions of the extrusion head, i.e. the diameters of central orifice 27 and the width of annular passage 26 are those of the billet 14 and the ultimate food product, this being a true extrusion. The casing 13 preserves this extruded configuration. FIG. 9 shows the cross section of the billet and the food product.

Referring now to FIG. 10 the extruded billet 14 with the closed and rounded front end part 29 leaves the extrusion head 10 and apparatus 9 and travels along the track 15 in the direction x towards the microswitches 19 and 20. When the front end part of the billet 14 contacts and closes the first microswitch 19 extrusion ceases and the apparatus 9 operates to form, close and clip the rear end of the billet 14 and the front end of the billet immediately behind. The billet then resumes its advance driven by means on track 15 to close the second microswitch 20 which operates to tilt the track sideways in the direction of arrows y thereby tipping the billet through flap 17 into freezing tank 18. The billets move transversely of their length through tank 18 and are retrieved frozen for cutting to the desired length and any packaging required.

It should be appreciated that the billet 15 as discharged from the extruder is, in principle, a food product in itself suitable for slicing and cooking. The casing 14 remains on the product right through storage, sale and cooking to the plate. The freezing operation envisaged above could thus be supplemented or replaced by a cooking, smoking or other preparation.

It should be re-emphasised that although the invention has been described by way of example with reference to turkey meat it is applicable to any kind of solid raw meat.

The transparent non-toxic casing stock may be of any suitable "skin" material typically of cellulose, polyamide or polyester. One suitable polyester casing material is sold under the Trade Mark Nalophan.

We claim:

1. A method of making a meat product with a relatively thin uniform outer layer of fat completely surrounding and directly contacting the meat and within which the meat is cooked, which comprises pumping relatively solid intact natural meat pieces through a central passage of an extrusion mandrel and pumping relatively fluid fatty material through a separate annular passage in said extrusion mandrel, increasing the cross-sectional area of the meat to relax the meat and reducing the thickness of the fatty material in a laterally enlarged extrusion head located at the outlet end of the extrusion mandrel, coextruding, through respective orifices in the outlet end of said extrusion head, the meat, as a core, and the fatty material, as a uniform outer annular layer completely surrounding and directly contacting the meat, directly into a flexible fitting fcasing to form elongated encased billets of the meat product.

2. A method as claimed in claim 1 wherein the elongated billets are is subsequently frozen and cut to lengths.

3. A method according to claim 1 wherein the flexible fitting casing into which the meat and fatty material are directly coextruded is taken from casing stock stored on a body portion of the extrusion mandrel behind said extrusion head.

* * * * *